United States Patent [19]
Cooper

[11] 3,985,978
[45] Oct. 12, 1976

[54] METHOD AND APPARATUS FOR CONTROL OF FM BEAT DISTORTION

[76] Inventor: Duane H. Cooper, 918 W. Daniel St., Champaign, Ill. 61820

[22] Filed: May 9, 1974

[21] Appl. No.: 468,238

Related U.S. Application Data

[63] Continuation-in-part of Ser. Nos. 187,065, Oct. 6, 1971, Pat. No. 3,856,992, and Ser. No. 288,873, Sept. 13, 1972, Pat. No. 3,906,156.

[30] Foreign Application Priority Data
May 10, 1973 Japan.................................. 48-52075

[52] U.S. Cl. ..................... 179/100.4 ST; 179/1 GQ; 360/25; 360/29
[51] Int. Cl.²....................... G11B 23/18; G11B 3/00
[58] Field of Search ... 179/1 GQ, 15 BT, 100.1 TD, 179/100.4 ST; 360/25, 26, 29

[56] References Cited
UNITED STATES PATENTS 3,761,628  9/1973  Bauer............................... 179/1 GQ
3,786,193  1/1974  Tsurushima................. 179/100.4 ST

*Primary Examiner*—Bernard Konick
*Assistant Examiner*—Jay P. Lucas
*Attorney, Agent, or Firm*—Fitch, Even, Tabin & Luedeka

[57] ABSTRACT

A method and apparatus is disclosed for reducing crossover modulation distortion generated at a sub-channel and for minimizing phase differences between 4-channel signals that are recorded on a recording medium in a multiple-frequency manner. More specifically, the present invention is directed to reducing or eliminating the beat distortion that is caused by crosstalk between a sub-channel signal and a main channel signal when the main channel signal is recorded according to RIAA-TYPE recording characteristics.

16 Claims, 16 Drawing Figures

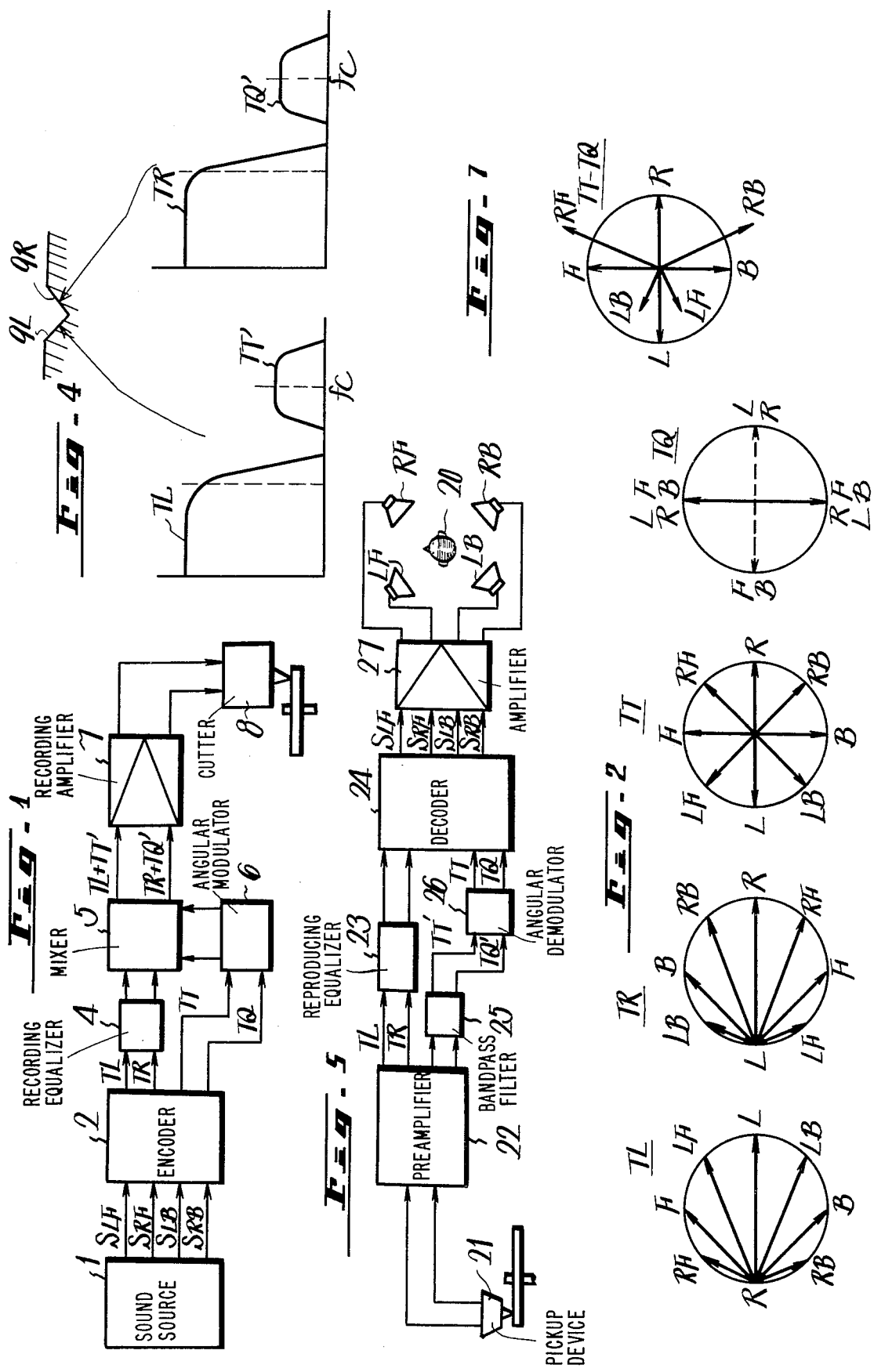

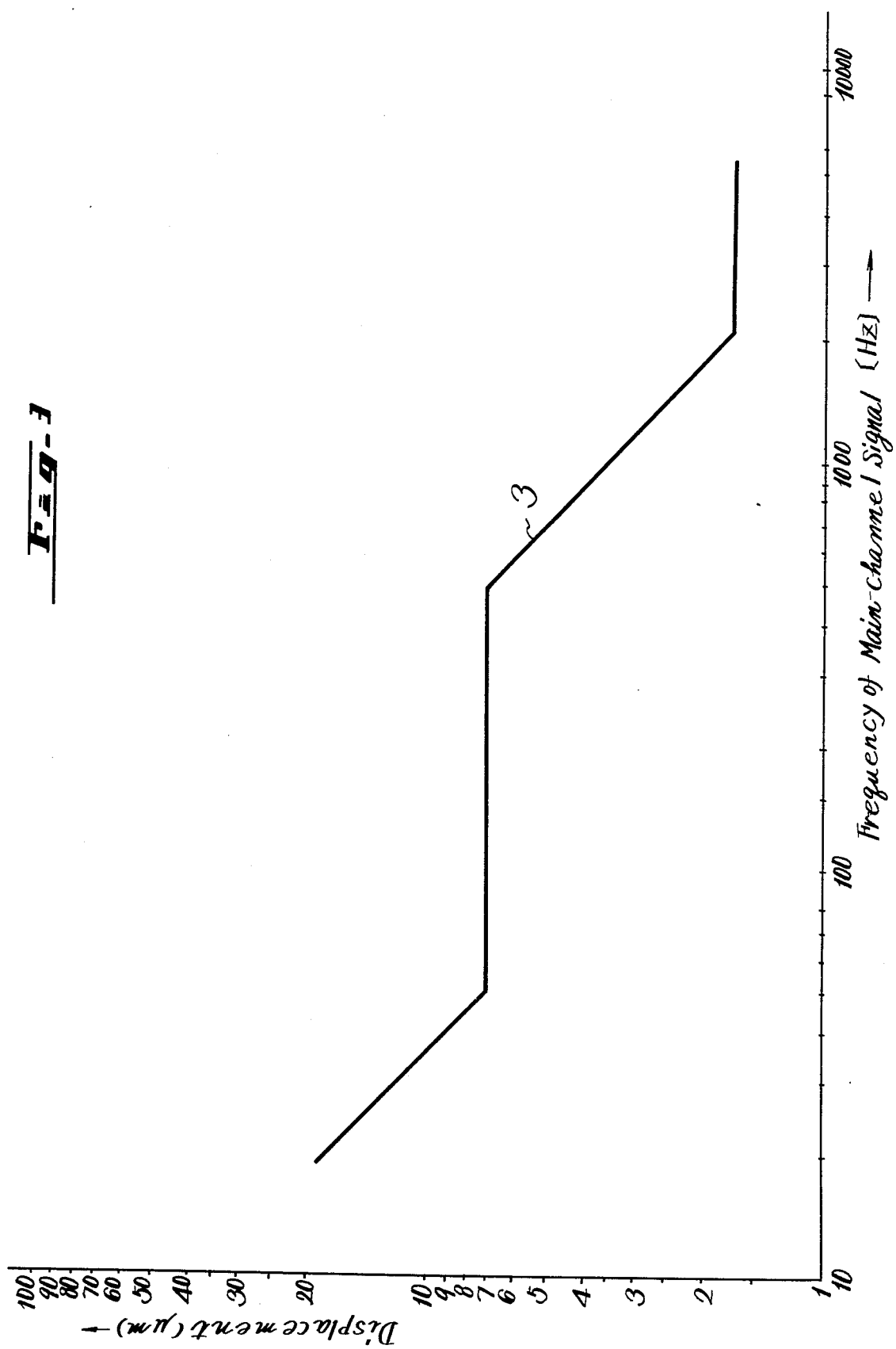

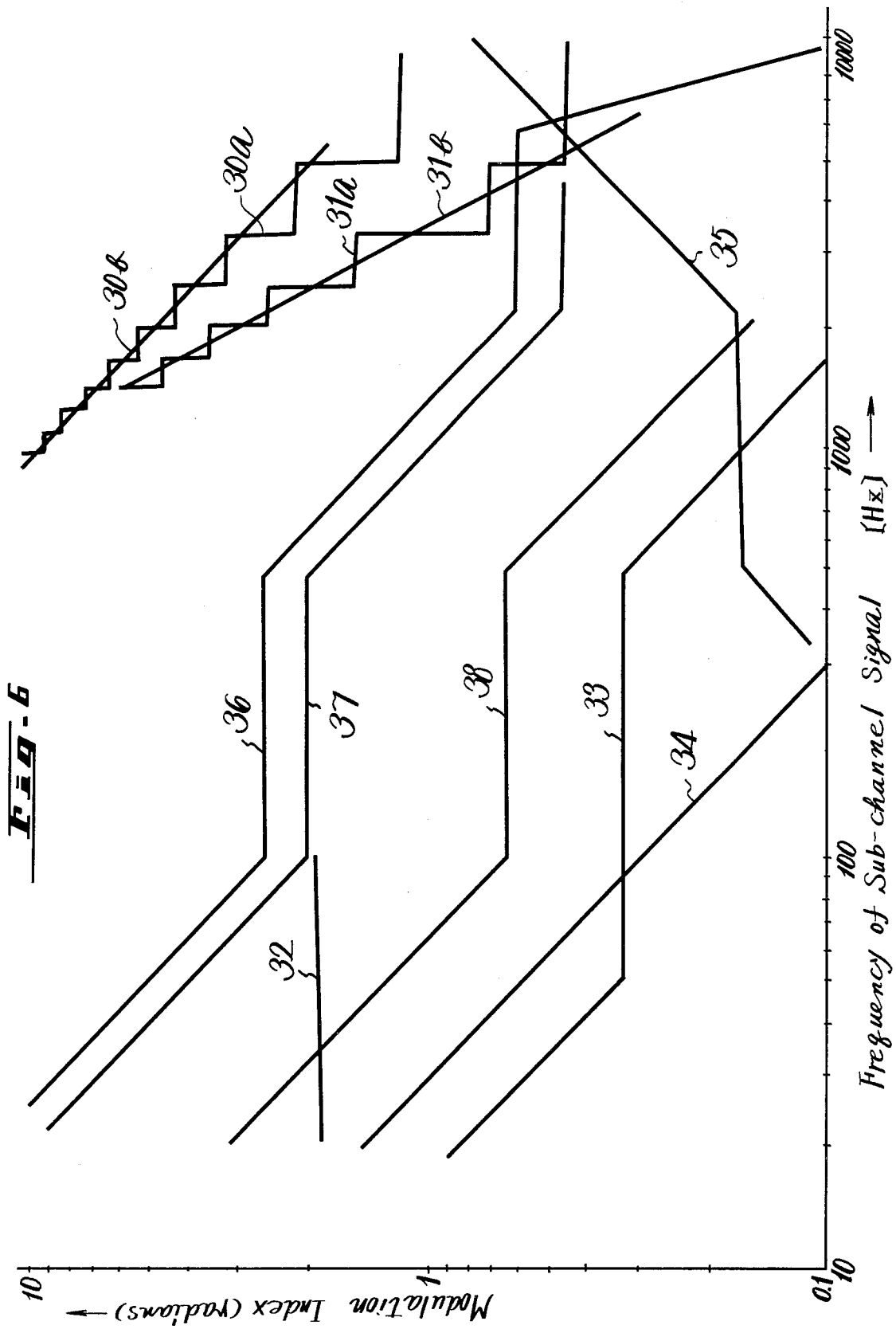

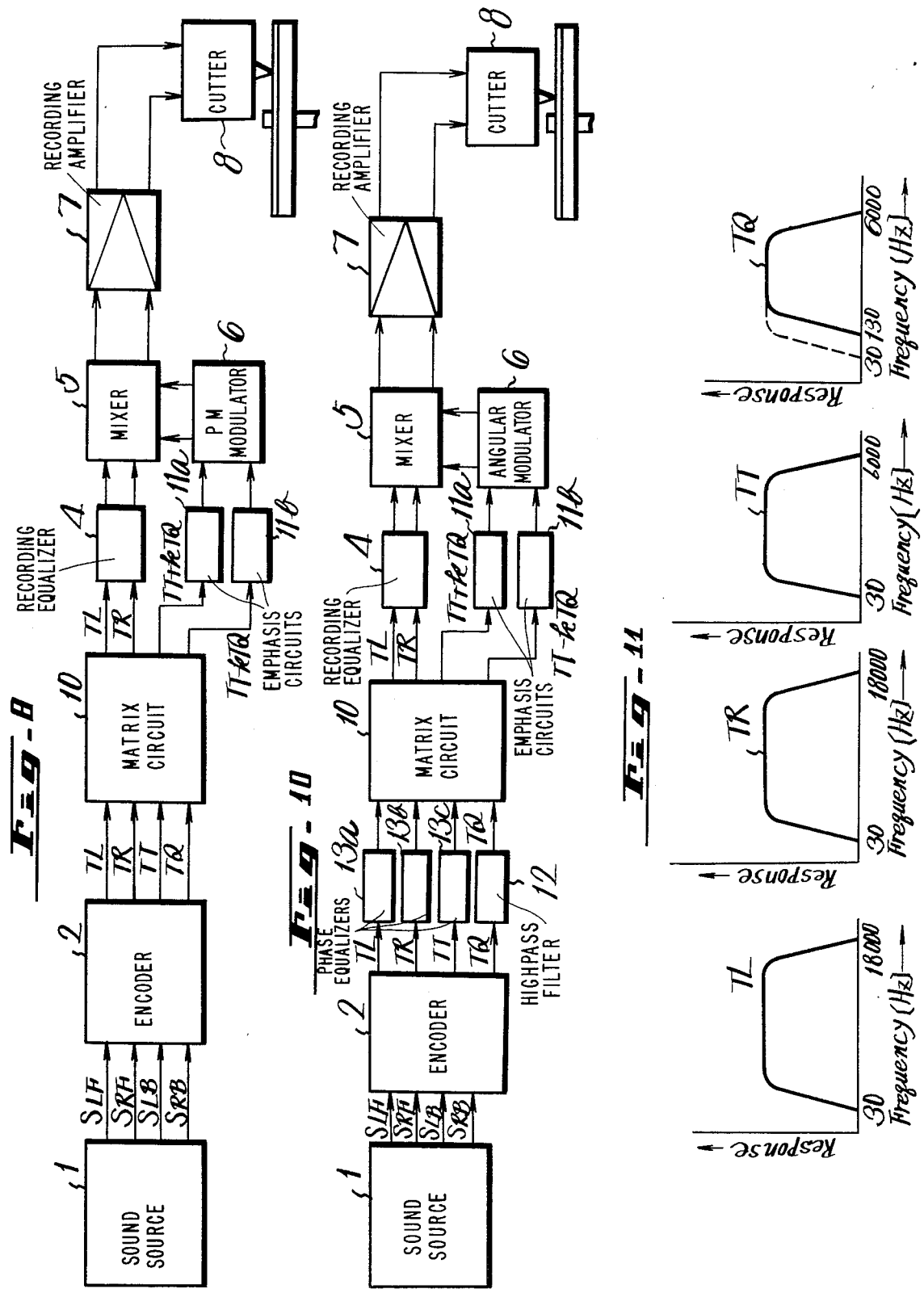

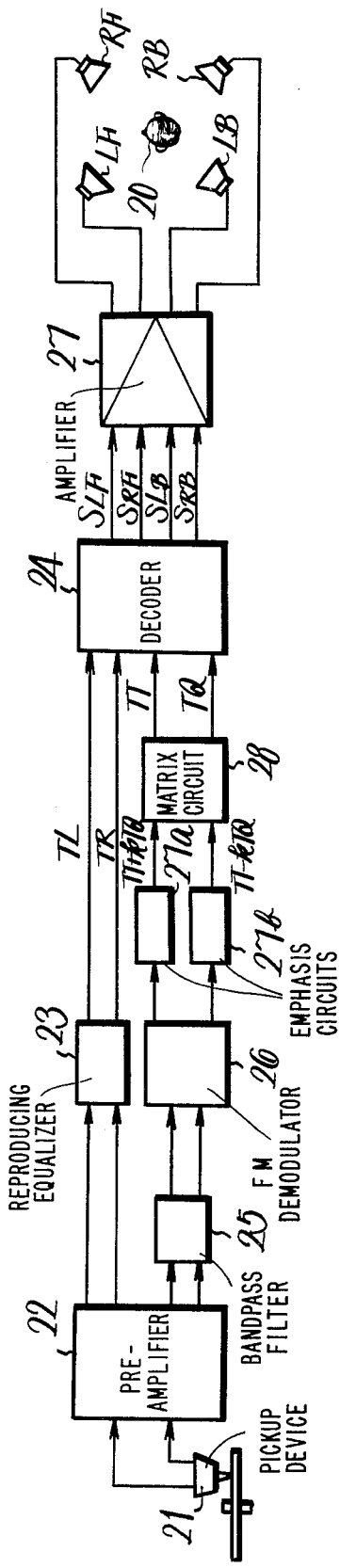
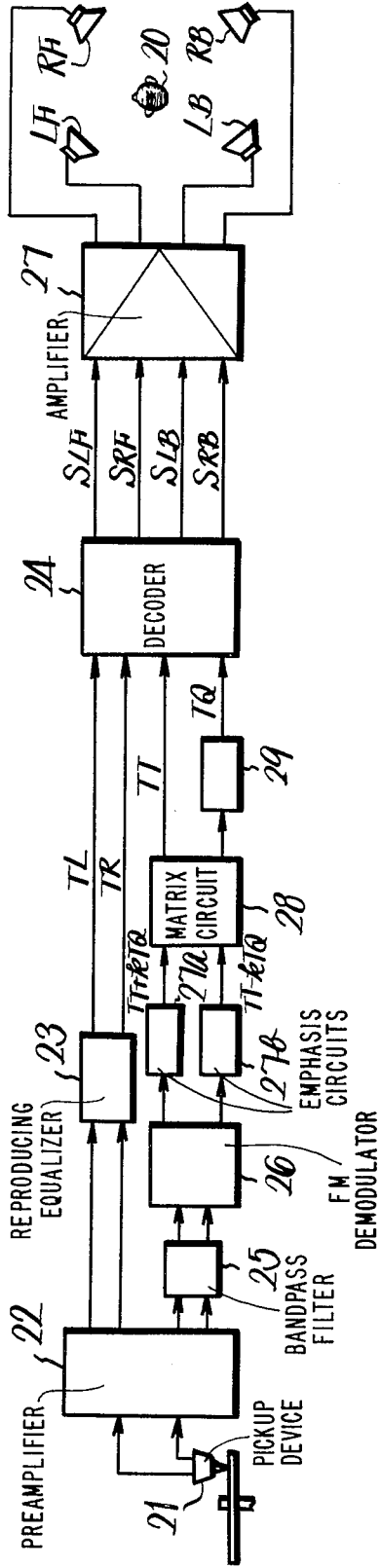

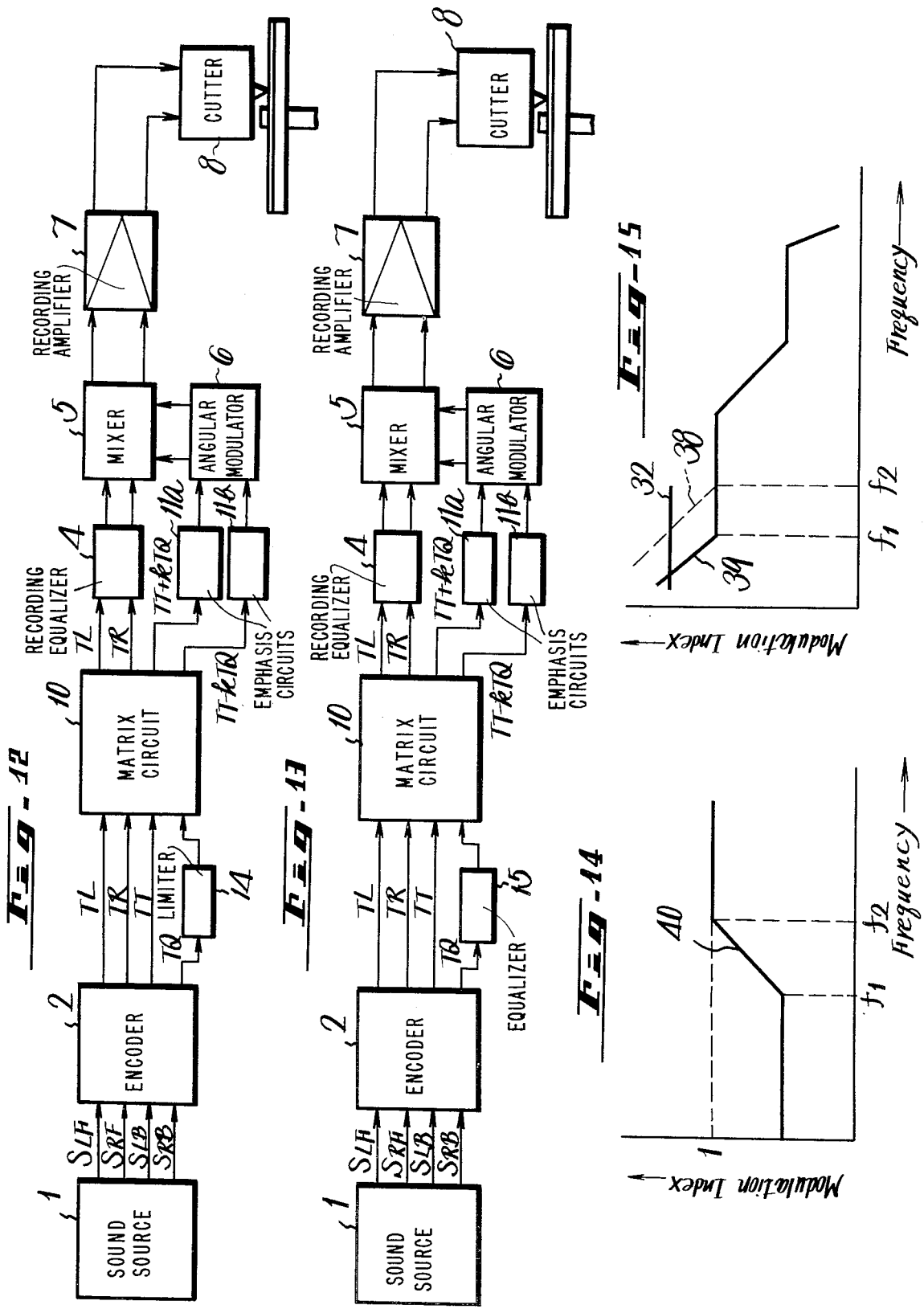

METHOD AND APPARATUS FOR CONTROL OF FM BEAT DISTORTION

This application is a continuation-in-part of application Ser. No. 187,065, filed Oct. 6, 1971 and now Pat. No. 3,856,992 and application Ser. No. 288,873, filed Sept. 13, 1972 and now U.S. Pat. No. 3,906,156.

The present invention relates generally to recording and reproducing systems and more specifically to apparatus for producing multi-dimensional audio signals which have greater directional characteristics and improved ambience as compared with conventional stereo apparatus.

The present invention is generally directed to the sound recording and reproducing art which is popularly known as "four-channel stereo", which in the prior art is generally classified into three groups, such as a discrete system (4-4-4), a matrix system (4-2-4), and an artificial 4-channel system (2-2-4). Recently, the applicant of the present invention has proposed a "universal matrix system" (hereinafter referred to as the UM-system) which has many advantageous and desirable attributes when compared to the above mentioned prior art systems. The UM-system which is described in the above identified parent applications, has many desirable features, such as good compatibility with monaural and ordinary 2-channel systems, faithful reproduction of sound sources, well positioned sound images and variable locations of loud speakers.

Referring to the drawings, an application of the UM-system will be described as applied to a 4-channel stereo apparatus. Referring specifically to FIG. 1, there is illustrated a block diagram including a recording-disc cutting system having a sound source 1. Four signals, namely, $S_{LF}$, $S_{RF}$, $S_{LB}$, and $S_{RB}$ are derived from the sound source from microphones which correspond to loud speakers LF, RF, LB, and RB located at four corners to form a square (2+2 disposition) and a listening space surrounding a listener 20 at a recording-disc reproducing system, such as shown in FIG. 5. The signals derived from the microphones corresponding to the loud speakers LF, RF, LB and RB are defined as $S_{LF}$, $S_{RF}$, $S_{LB}$, and $S_{RB}$, respectively. These four signals are applied to encoder 2 from which are derived signals TL, TR, TT, and TQ having the following relationships:

$$TL = 0.924\ S_{LF}\ /+22.5° + 0.383\ S_{RF}\ /+67.5°$$
$$+ 0.383\ S_{RB}\ /-67.5° + 0.924\ S_{LB}\ /-22.5°$$

$$TR = 0.383\ S_{LF}\ /-67.5° + 0.924\ S_{RF}\ /-22.5°$$
$$+ 0.924\ S_{RB}\ /+22.5° + 0.383\ S_{LB}\ /+67.5°$$

$$TT = 1.414\ S_{LF}\ /+135° + 1.414\ S_{RF}\ /+45° + 1.414\ S_{RB}\ /-45° + 1.414\ S_{LB}\ /-135°$$

$$TQ = 1.414\ S_{LF}\ /+90° + 1.414\ S_{RB}\ /-90° + 1.414\ S_{RB}\ /+90° + 1.414\ S_{LB}\ /-90°$$

The signals TL and TR are referred to the main-channel signals while the signals TT and TQ are sub-channel signals. These transmission signals are expressed in vector form in FIG. 2.

The main-channel signals TL and TR derived from the encoder 2 are fed through a recording equalizer 4 to the mixer 5. The characteristic of the recording equalizer is standardized in accordance with the RIAA recording characteristic shown by a curve 3 in FIG. 3. The sub-channels TT and TQ are applied to an angular modulator 6 to angularly modulate a carrier frequency signal $f_c$. Thus, the angular-modulated carrier frequency signals $f_c$ are referred to as modulated sub-channel signals TT' and TQ'. These modulated channel signals TT' and TQ' are mixed with the main channel signals by mixer 5 to form two transmission signals TL+TT' and TR+TQ'. These two transmission signals are thereafter supplied through a recording amplifier 7 to a 45—45 cutter 8, similar to that used for producing a conventional stereo recording disc. The 45—45 cutter 8 engraves one face of a groove with a signal TL+TT' and the other face with the signal TR+TQ' as shown in FIG. 4. In other words, the groove is recorded at its one groove wall 9L with the main channel signal TL and modulated sub-channel signal TT' and the other groove wall 9R is recorded with a main channel signal TR and a modulated sub-channel signal TQ'.

Referring to FIG. 5, which illustrates a block diagram of a reproducing system for reproducing a recording disc, it should be understood that a reproducing signal from a pickup 21 is applied to a preamplifier 22. The main channel signals TL and TR derived from the preamplifier 22 are supplied to a decoder 24 through a reproducing equalizer 23 with a characteristic that is reversed with respect to the recording equalizer 4. The modulated sub-channel signals TT' and TQ' supplied by the preamplifier 22 are passed through a bandpass filter 25 and are thereafter demodulated by an angular demodulator 26 to produce the sub-channel signals TT and TQ. The sub-channel signals TT and TQ are then fed to the decoder 24 together with the main channels TL and TR to produce the same signals as the audio signals $S_{LF}$, $S_{RF}$, $S_{LB}$, and $S_{RB}$ that were generated by the sound source 1. These four signals are then supplied to an amplifier 27 and thereafter to corresponding loud-speakers LF, RF, LB, and RB which are arranged in 2+2 disposition.

It is an object of the present invention to eliminate or substantially reduce FM beat distortion which can be produced when the modulated sub-channel signals are mixed with the main channel signals during recording on the right and left walls of a groove.

Other objects and advantages will become apparent upon reading the following detailed description, while referring to the attached drawings in which:

FIG. 1 is a block diagram showing one example of a recording-disc cutting system for multi-dimensional audio signals;

FIG. 2 is a series of vector diagrams of sub-channel signals encoded by the recording-disc cutting system;

FIG. 3 is a graph illustrating an RIAA-type recording characteristic for the main-channel signal;

FIG. 4 is a schematic view illustrating a recording-disc tracking system for producing multi-dimensional audio signals;

FIG. 5 is a block diagram of one example of a recording disc reproducing system for multi-dimensional audio signals;

FIG. 6 is a graph illustrating various disturbance characteristics for the sub-channel signals and a modulation curve of the same;

FIG. 7 is a vector diagram of the difference between the encoded sub-channel signals TT and TQ;

FIG. 8 is a block diagram showing another embodiment of the recording disc cutting system of the present invention;

FIG. 9 is a block diagram illustrating another embodiment of the recording disc reproducing system of the present invention;

FIG. 10 is a block diagram illustrating another embodiment of the recording disc recording system of the present invention;

FIG. 11 is a series of frequency vector diagrams useful in explaining the embodiment of FIG. 10;

FIG. 12 is a block diagram showing yet another embodiment of the recording disc cutting system of the present invention;

FIG. 13 is a block diagram illustrating still a further embodiment of the recording disc cutting system of the present invention;

FIGS. 14 and 15 are graphs useful in explaining the recording disc recording system of FIG. 13; and, FIG. 16 is a block diagram illustrating yet another recording reproducing system that is compatible with the recording disc cutting system shown in FIG. 13.

In keeping with the present invention, the various problems that can occur when recording and reproducing multidimensional audio signals of the type mentioned herein are described. There is a limit to the amount of frequency deviation than can be permitted. Overmodulation of a carrier signal which is mixed with a lower frequency range signal may be caused when the frequency deviation exceeds the frequency limit that is determined with respect to the modulated sub-channel. However, when the carrier signal is modulated by a higher frequency range signal, the modulated sub-channel will have a frequency spectrum which is wider than the frequency deviation. The largest frequency deviation that is permissible so that 5% of the carrier energy is spread beyond the bands of 10 K Hz at both ends is formed in a step-shape shown by the curve 30a in FIG. 6. The curve 30b of FIG. 6 illustrates the carrier frequency from which the deviation curve 30a is based. When the modulated sub-channel signals pass through the bandpass filter 25 shown in FIG. 5, which is used to separate the sub-channel signals in the reproducing system, the modulation distortion occurs.

With respect to harmonic distortion, a limit of, for example, 5% results in a stepped-shape as shown by the curve 31a in FIG. 6. In the event a symmetrical filter is used, the harmonic distortion becomes an odd-order type, while a single band type filter would produce an even-ordered harmonic distortion, the straight line 31b illustrating its general characteristic. The modulation curve of a sub-channel signal cannot exceed the curves 30a and 30b without producing unacceptable distortion.

Additionally, when crosstalk is present between modulated sub-channel signals, beat distortion occurs in the demodulated sub-channel signals. Crosstalk occurs in general when a signal is recorded on and reproduced from a recording disc and is generated from the cutter head, cutting stylus and the like. To substantially eliminate crosstalk during the recording of a disc, it is generally necessary to employ a high quality cutter head cutting stylus and the like. During reproduction, crosstalk is produced when a signal is picked up from a groove of the recording disc by a pickup device and it is difficult to record a disc during production that will result in virtual removal of crosstalk produced by the pickup device. Moreover, the generation of beat distortion produced by crosstalk of the carrier frequency band that is nonlinear and gives rise to complex harmonic and inter-modulation distortions if the relative phase deviations are large. That is, if the crosstalk between groovewalls is in phase, the distortion is of an odd order and is proportional to $J_{2n-1}(x)/x$ ($n$ indicates a positive integer), if $x$ is the peak phase difference. If the crosstalk between groovewalls in quadrature phase, the distortion is of even order and is proportional to $J_{2n-1}(x)/x$, where $n$ indicates a positive integer and $J_n(x)$ is a first-kind n-order Bessel Function. In these cases, the distortion is proportional to the magnitude of the crosstalk. As examples, for an $x$ value of 3.6 the component $J_3(x)/x$ becomes maximum, while for an $x$ value of 2.3 the component $J_2(x)/x$ becomes maximum, and the component $J_2(x)/x$ is equal to the component $J_3(x)/x$ at a value of 3.8. The harmonic distortion in this case is about 2% with the crosstalk being −20dB. The low and high order distortions are critically generated at the modulation index of 3.8 radians, which is the modulation index difference of the critical level and it is half the difference that is shown by the line 32 in FIG. 6. When the modulation curve of the sub-channel signal exceeds the line 32, the beat distortion is increased.

There is also crosstalk from the main channel signal to the sub-channel signal which is caused during reproduction, and this type of crosstalk is referred to as uptalk, which is produced by both tracking angle-error and tracing error. The other type of crosstalk, i.e., from a sub-channel signal to a main channel signal, is referred to as downtalk. The downtalk is significant in the tracing-error process, but is not significant when the modulated sub-channel signal is recorded at a constant velocity.

Uptalk produced from tracking angle-error is produced if displacement of the modulated sub-channel signal is small as compared with that of the main-channel signal and the modulated sub-channel signal is subjected to phase modulation of $2\pi/\lambda c$ am tan $\phi$, where am denotes displacement of the main channel signal, $\lambda c$ is the wavelength of carrier signals and $\phi$ is the tracking error angle. Uptalk caused by vertical tracking error angle, for example, is produced mainly by the vertical or difference signal component of the main channel signal. If the main channel signal is recorded according to the RIAA- recording characteristics shown by the curve 3 of FIG. 3, uptalk from vertical tracking angle of 5° would be produced with a limit shown by 33 in FIG. 6.

Further, the demodulated signal produces a rumble-type distortion caused by revolving irregularity, i.e., flutter independent of the influence of the main channel signal, which is analogous to uptalk. The distortion of, for example, 0.1% flutter of the sub-channel is shown by line 34 in FIG. 6 and, accordingly, the modulation curve of the sub-channel signal should be separated from the lines 33 and 34. Additionally, tracing error uptalks are produced from the main channel signals to the sub-channel signals, respectively, at two groove walls and the total sum of these uptalks are shown by curve 35 of FIG. 6. The curve 35 results when the recording speed is at 11.15 mm/sec and the stylus radius is 5 microns.

As previously mentioned, the sub-channel signal is affected by the rumble-type distortion (characteristic 34) in the lower frequency range and is caused by revolving irregularity in the demodulated signal, tracking angle error uptalk (characteristic 33) and beat distortion (line 32) caused by crosstalk between the sub-channel signals. Further, in intermediate and higher frequency ranges, the sub-channel signals are affected by tracking error uptalk (characteristic 35) and clipping distortion (curve 31b) which is due to the frequency band limit. The uptalks (characteristics 33 and 35) produced by the main channel signal, the beat distortion (curve 32) caused by crosstalk between close channel signals and the clipping distortion (curve 31b) caused by the frequency band limit are generally referred to as crossover modulation distortion.

In accordance with the present invention, provision is made for eliminating or substantially reducing the crossover modulation distortion, and such elimination or reduction is achieved by angularly modulating the sub-channel signal in a manner whereby it is separated by the curves which represent the aforementioned disturbances.

In the lower frequency range, the modulation curve is separated from the characteristics or curves 32, 33, and 34; in the intermediate high frequency ranges, its characteristic is selected so as to be intermediate the curves 31b and 35. It is also noted that it is advantageous for the two main channel signals and the two sub-channel signals to conform with each other in terms of frequency-amplitude and phase characteristics so that they are separated from one another when the four signals are matrix-demodulated. Accordingly, an emphasis characteristic is given to the sub-channel signal to form a pre-determined modulation curve which is selected to agree with the RIAA type characteristic shown in FIG. 3 and thereby eliminate characteristic variations between the main channel signals and sub-channel signals in the recording disc reproducing system. In this instance, particularly with respect to the disturbance characteristic 34 caused by flutter, it is preferable to slightly increase the corner frequency in the lower frquency range.

The sub-channel signals TT and TQ in the case of the above described system is shown in FIG. 2 so that the difference factor of TT−TQ corresponds to the relative phase deviation of these two sub-channel signals and is expressed in FIG. 7. As should be understood from FIG. 7, the relative phase deviation is varied according to the second source position and hence generation of the beat distortion is changed according to the sound source positions.

Thus, if two signals TT+kTQ and TT−kTQ are selected as sub-channel signals their relative phase deviation becomes 2kTQ. Accordingly, the relative phase deviation becomes uniform in distribution in accordance with the sound source positions. In the event $k$ is smaller than 0.38, the relative phase deviation expressed by vector is analogous to the vector display of the signal TQ and its magnitude in the case where the sound source is separately disposed in positions of LF, RF, LB, and RB become small as compared with that of TT−TQ. If $k$ is smaller than ½, the value of 2kTQ becomes small as compared with that of TT−TQ at a wide range of sound source positions.

In keeping with the present invention, a reference modulation curve of the sub-channel signals TT±kTQ is shown by a characteristic or line 36 in FIG. 6 which is analogous to the RIAA-type characteristic curve 3 shown in FIG. 3. Therefore, it has an FM modulation characteristic when the sub-channel signal has a frequency range of less than 100Hz, PM-modulation in the range from about 100Hz to 500Hz, FM-modulation in the range from about 500Hz to 2100Hz, PM-modulation in the range from 2100Hz to 6000Hz and FM modulation for frequency greater than 6000Hz.

The line 37 denotes a modulation curve of the same-phase component TT between two sub-channel signals TT+kTQ and TT−kTQ for a value of $k = ⅓$, and the line 38 illustrates their reversed phase component kTQ for a value $k = ⅓$.

The block diagram of FIG. 8 illustrates an embodiment of a recording disc cutting system of the present invention where the signals TL, TR, TT, and TQ from an encoder 2 are applied to a matrix circuit 10 to derive the main channel signals TL and TR and the sub-channel signals TT+kTQ and TT−kTQ. The main channel signals TL and TR are supplied through a recording equalizer 4 to a mixer 5, while the sub-channel signal TT+kTQ is supplied through an emphasis circuit 11a to a PM-modulator 6, and the sub-channel TT−kTQ is supplied through an emphasis circuit 11b to the PM-modulator 6. These emphasis circuits 11a and 11b in the PM-modulator 6 angularly modulate the sub-channel TT+kTQ and TT−kTQ according to the modulation curve 36 shown in FIG. 6. Thereafter, the main channel signals and modulated sub-channel signals are divided into two transmission channels for recording on right and left groove walls by the 45—45 cutter 8.

To reproduce the recorded disc, and referring to the block diagram of FIG. 9, the reproducing signals derive from a pickup device 21 and are fed to a preamplifier 22 and the modulated sub-channel signals are separated by a bandpass filter 25 and fed to an FM demodulator 26. The demodulated outputs from the FM demodulator 26 are supplied to a matrix circuit 28 through the emphasis circuits 27a and 27b which have a characteristic that is the reverse of the emphasis circuits 11a and 11b of the recording disc cutting system. The sub-channel signals TT and TQ obtained from the matrix system 28 are applied to the decoder 24 along with the main channel signals TL and TR. From the decoder 24, the audio signals $S_{LF}$, $S_{RF}$, $S_{LB}$, and $S_{RB}$, corresponding to the particularly disposed sound sources are produced, which are amplified and supplied to the loud speakers LF, RF, LB, and RB, respectively. It should be understood that the encoder 2 and matrix 10 of the above described recording disc cutting system can be constructed as a single matrix circuit, and, similarly, decoder 24 and matrix circuit 28 can also be formed as a single matrix circuit.

As previously mentioned, when the sub-channel signals are selected, for example, as TT+kTQ and TT−kTQ, the beat distortion is caused by the signal TQ as the reverse phase component between these two sub-channel signals. As a result, if the signal TQ is reduced so that it has a small or approximately zero value in a frequency range such that a relative phase deviation becomes large, the beat distortion can be greatly reduced.

Referring to FIG. 10, a recording disc cutting system is shown for accomplishing a reduction of the beat distortion. The signal TQ supplied by the encoder 2 is fed through a highpass filter 12 to a matrix circuit 10. Since the highpass filter 12 has a phase characteristic, phase equalizers 13a, 13b, and 13c are respectively provided for the other signals TL, TR, and TT from the encoder 2 to keep the proper phase relationships relative to one another. Accordingly, the frequency spectra of the signals TL, TR, TT, and TQ supplied to the matrix circuit 10 are as shown in FIG. 11. The signals TL and TR have all of the frequency components of the band necessary for reproduction of the sound field, while the signals TT and TQ have minimum frequency components and, additionally, the lower frequency range of the signal TQ is cut off. However, this cutting off of the TQ signal produces no noticeable reduction in listening fidelity with respect to the position or localization of low and high pitched sounds. In fact, from a practical standpoint, there is good separation or localization of the source signals during reproduction when only the signals TL, TR, and TT are used.

The recording disc cutting system shown in FIG. 10 is suitable for use not only with the UM- or discrete 4-channel stereo system, but also in such matrix systems which have a 4-channel effect and use only a main channel signal, further modified by adding two subchannel signals.

Rather than removing the lower frequency range portion of the signal TQ which has a tendency to produce beat distortion, a limiter 14 can be used as shown in FIG. 12 to limit the level of the signal TQ when it is increased to a given level or becomes sufficiently large to produce beat distortion. Since the limiter 14 is not designed to completely cut off the lower frequency range of the signal TQ, effects in realistic sensitivity, ambience, directional sense and the like will continue to be produced without any detrimental effect.

If the recording system disc cutting systems of either FIG. 10 or FIG. 12 are used to make a recording disc, and the highpass filter 12 as well as the phase equalizers 13a, 13b, and 13c or the limiter 14 is incorporated into these systems, the recording disc reproducing system shown in FIG. 9 can be used for reproduction or playback.

Additionally, when a signal TQ is supplied to a matrix circuit 10, an equalizer 15 is preferably used to pass the signal therethrough, as shown in FIG. 13. The equalizer 15 has a frequency characteristic 40 as shown in FIG. 14, so that when the equalizer 15 passes the signal TQ therethrough, the modulation curve for the set of channel signals TT+kTQ and TT−kTQ is changed and corresponds to line 39 rather than line 38, both of which are depicted in FIG. 15. As a result, the range of the modulation curve exceeding the line 32 which indicates the limit for the beat distortion, is extended to a lower frequency range to thereby reduce the beat distortion.

In the event the recording disc on which the signal is recorded by the recording disc cutting system of FIG. 13 is reproduced, a signal TQ from a matrix system 28 is supplied to an equalizer 29 (see FIG. 16) and the characteristic is reversed relative to the equalizer characteristic shown in FIG. 14. A signal TQ which is corrected by the equalizer 29 is applied to a decoder 24.

In accordance with the present invention, an emphasis characteristic for modulating a sub-channel signal in a manner corresponding to the modulation curve 36 is selected to match the RIAA-type characteristic for the main channel signal, the main channel signal parallels the sub-channel signal in frequency-amplitude and phase characteristics and thereby results in desirable separation of the signals.

From the foregoing detailed description of the present invention, it should be understood that an improved FM beat distortion and multi-dimensional audio signal recording and reproduction system has been described. More specifically, the present invention utilizes recording and reproducing of the main channel signals using a RIAA-type characteristic and also incorporates sub-channel signals that have similar characteristics so as to maintain adequate separation which permits substantial reduction of the presence of FM beat distortion which can detrimentally affect the quality of the best system. Moreover, the present invention is applicable not only to this system but also to the system generally referred to as the CD-4 system and the like with the same advantages.

The system is also applicable not only for recording discs, but also for a magnetic tape having a plurality of tracks.

Although particular embodiments of the present invention have been illustrated, various other modifications, substitutions and alternatives will be apparent to those skilled in the art, and accordingly, the scope of the invention should be defined only by the appended claims and equivalents thereof.

Various features of the invention are set forth in the following claims.

I claim:

1. Apparatus for recording 4-channel signals as main channel and frequency modulated subchannel signals on two groove-walls of a recording disc with provision for reduction of crossover modulation distortion, comprising first main channel input means for a first main channel signal, second main channel input means for a second main channel signal, first subchannel input means for a first subchannel signal to be recorded on a first recording disc groovewall with said first main channel signal, second subchannel input means for a second subchannel signal to be recorded on a second recording disc groovewall with said second main channel signal, means for angularly modulating a carrier signal with said first and second subchannel signals, respectively, to provide a first angularly modulated subchannel signal and a second angularly modulated subchannel signal, recording equalizer means for emphasizing said first and said second main channel signals in accordance with the RIAA recording characteristic, means for providing said first and said second subchannel signals with an emphasis characteristic such that the modulation curve of said modulated subchannel signals corresponds to said RIAA emphasis characteristic of said recording equalizer means, means for adding said first angularly modulated signal and said first main channel signal to provide a recording signal for said first groovewall, means for adding said second angularly modulated subchannel signal and said second main channel signal to provide a recording signal for said second groovewall, and recording means for recording said first and second recording signals, respectively, on the first and second groovewalls of a recording disc.

2. Apparatus in accordance with claim 1 wherein the value of the log of the modulation index of said modulation curve versus the log of the frequency of the subchannel signal of said modulation curve increases with decreasing frequency from a corner frequency of about 100 Hz or less, remains constant from said corner frequency to about 500 Hz, decreases with increasing frequency from about 500 Hz to about 2100 Hz, remains constant from about 2100 Hz to about 6000 Hz, and decreases with increasing frequency above about 6000 Hz.

3. Apparatus in accordance with claim 2 further including matrixing means for providing main channel signals TL and TR and subchannel signals TT and TQ in accordance with the UM matrixing system.

4. Apparatus in accordance with claim 3 further including means for reducing the lower frequency range of subchannnel signal TQ while maintaining its relative phase relationship with signals TL, TR and TT.

5. Apparatus in accordance with claim 3 further including means for matrixing signals TT and TQ to provide said first and second subchannel signals as TT + kTQ and TT−kTQ where $k$ is less than ½.

6. Apparatus in accordance with claim 5 wherein $k$ is ⅓.

7. A two channel recording with provision for reduction of crossover modulation distortion having 4-channel audio signals recorded thereon as two main channel and two frequency modulated subchannel signals wherein one main channel and one frequency modulated subchannel are recorded on each channel of the recording and wherein each of said recorded subchannel signals has a modulation index emphasis which corresponds to the recording emphasis of each of said main channel signals.

8. A recording in accordance with claim 7 wherein the recording is a recording disc and wherein the emphasis characteristic of said main channel signals is the RIAA characteristic.

9. A recording disc in accordance with claim 8 wherein the value of the log of said modulation index versus the log of the frequency of the subchannel signal of said modulation curve increases with decreasing frequency from a corner frequency of about 100 Hz or less, remains constant from said corner frequency to about 500 Hz, decreases with increasing frequency from about 500 Hz to about 2100 Hz, remains constant from about 2100 Hz to about 6000 Hz, and decreases with increasing frequency above about 6000 Hz.

10. A recording disc in accordance with claim 9 wherein the main channel signals are TL and TR and wherein the subchannel signals are TT + kTQ and TT − kTQ where $k$ is less than ½, matrixed in accordance with the UM matrixing system.

11. A method for recording 4-channel signals as main channel and frequency modulated subchannel signals comprising
providing first and second main channel signals having a recording emphasis characteristic,
providing first and second subchannel signals,
angularly modulating a carrier signal with said first and second subchannel signals to provide a first angularly modulated subchannel signal and a second angularly modulated subchannel signal having a modulation index emphasis characteristic corresponding to said main channel recording characteristic,
adding said first angularly modulated signal and said first main channel signal to provide a recording signal for a first recording channel,
adding said second angularly modulated subchannel signal and said second main channel signal to provide a recording signal for a second recording channel, and
recording said first and second recording signals as the first and second channels of a recording.

12. A method in accordance with claim 11 wherein said first and second channels are the first and second groovewalls of a recording disc and wherein said main channels are emphasized in accordance with the RIAA recording characteristic.

13. A method in accordance with claim 12 wherein the value of the log of said modulation index versus the log of the frequency of the subchannel signal of said modulation curve increases with decreasing frequency from a corner frequency of about 100 Hz or less, remains constant from said corner frequency to about 500 Hz, decreases with increasing frequency from about 500 Hz to about 2100 Hz, remains constant from about 2100 Hz to about 6000 Hz, and decreases with increasing frequency above about 6000 Hz.

14. A method in accordance with claim 12 further including the steps of providing main channel signals TL and TR and subchannel signals TT + kTQ and TT − kTQ where $k$ is less than ½, in accordance with the UM matrixing system.

15. A method in accordance with claim 14 wherein the frequency spectra of signals TL and TR is from about 30 to about 18,000 Hz, wherein the frequency spectrum of signal TT is from about 30 to about 6000 Hz, and wherein the frequency spectrum of signal TQ is from about 130 to about 6000 Hz.

16. In an apparatus for reproducing 4-channel signals recorded as main channel and frequency modulated subchannel signals on 2 groovewalls of a recording disc having the main channel signals of the recording disc recorded thereon with an RIAA emphasis recording characteristic, said apparatus including a preamplifier for signals from a recording disc pickup device, and a reproducing equalizer for the main channel signals, the improvement comprising said apparatus including means for filtering and demodulating said modulated subchannel signals to provide demodulated subchannel signals and for emphasizing said demodulated subchannel signals with an emphasis characteristic which is the reverse of the RIAA recording characteristic.

* * * * *